United States Patent
Ryu

(10) Patent No.: US 6,599,851 B1
(45) Date of Patent: Jul. 29, 2003

(54) COMPOSITION OF DIELECTRIC FOR PLASMA DISPLAY PANEL

(75) Inventor: Byung-Gil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/572,778

(22) Filed: May 17, 2000

(30) Foreign Application Priority Data

May 18, 1999  (KR) .......................................... 1999/17904

(51) Int. Cl.⁷ .......................... C03C 8/10; C03C 3/074; C03C 8/14; C03C 14/00
(52) U.S. Cl. ............................. 501/22; 501/76; 501/17; 501/32
(58) Field of Search ............................... 501/11, 14, 15, 501/16, 17, 18, 20, 21, 22, 23, 32, 76

(56) References Cited

U.S. PATENT DOCUMENTS

| | | | | |
|---|---|---|---|---|
| 4,578,619 A | * | 3/1986 | Braude | 313/480 |
| 5,674,634 A | * | 10/1997 | Wang et al. | 428/688 |
| 5,725,919 A | * | 3/1998 | Roberts et al. | 427/376.2 |
| 6,184,163 B1 | * | 2/2001 | Lee et al. | 313/586 |
| 6,271,161 B1 | * | 8/2001 | Ryu et al. | 501/76 |
| 6,287,995 B1 | * | 9/2001 | Lee | 501/15 |
| 2001/0051585 A1 | * | 12/2001 | Ryu et al. | 501/76 |

FOREIGN PATENT DOCUMENTS

| | | |
|---|---|---|
| JP | 53-82825 | 7/1978 |
| JP | 2000-095542 | 4/2000 |

OTHER PUBLICATIONS

Copy of Japanese Communication.

* cited by examiner

*Primary Examiner*—Mark L. Bell
*Assistant Examiner*—Elizabeth A Bolden
(74) *Attorney, Agent, or Firm*—Fleshner & Kim, LLP

(57) ABSTRACT

A composition of a dielectric for a plasma display panel in use for fabricating a barrier rib having a low sintering temperature, a low coefficient of thermal expansion, a low dielectric constant and a high withstand voltage. The composition of a dielectric for a plasma display panel comprising a parents glass powder containing 20~40 wt % of ZnO, 15~30 wt % of $SiO_2$, 10~20 wt % of $B_2O_3$, 0~30 wt % of PbO, 0~20 wt % of MgO, 1~10 wt % of CaO, 1~10 wt % of $Al_2O_3$, 0~10 wt % of $K_2O$, 0~8 wt % of $Na_2O$, 0~5 wt % of $Li_2O$, 0~2 wt % of $Sb_2O_3$, and 0~2 wt % of $As_2O_3$.

6 Claims, 1 Drawing Sheet

COMPOSITION OF DIELECTRIC FOR PLASMA DISPLAY PANEL

BACKGROUND OF THE INVENTION

1. Field of the Invention

The present invention relates to a composition of a dielectric for a plasma display panel, and more particularly, to a composition of a material for barrier ribs physically separating discharge cells and a composition of a material for a dielectric thick film for a rear substrate of a plasma display panel.

2. Description of the Background Art

Recently, a research and development for flat panel display apparatuses such as a liquid crystal display (LCD), a field emission display(FED) or a plasma display panel(PDP) is actively being conducted. Especially, the PDP is the most remarkable owing to its advantages in that it is easily produced due to its simple structure, a memory function, and a wide view angle more than 160° is attained, and a large screen more than 40 inches can be implemented.

FIG. 1 is a schematic view showing a structure of a plasma display panel in accordance with a conventional art.

As shown in the drawing, the plasma display panel includes two pieces of flat panels 10 and 20 horizontally disposed to each other, and discharge cells 30 formed to be sealed between the flat panels 10 and 20.

In detail, address electrodes 11 are formed on the upper surface of the rear substrate 10, and a lower dielectric thick film 12 for charging a wall charge is formed on the upper surface of the address electrodes 11 and on the rear substrate 10. Barrier ribs 13 are formed on the upper surface of the lower dielectric thick film 12 with the address electrodes 11 therebetween. The barrier ribs 13 serve to compart physically the discharge cells 30. Florescent materials 14 are coated on the wall side of the barrier ribs 13 and on the upper surface of the lower dielectric thick film 12.

Meanwhile, transparent electrodes 21 are formed at one face of the front substrate 20 placed at the upper position of the rear substrate 10, and the upper dielectric thick film 22 is coated on the one face of the front substrate 20 and the transparent electrodes 21. A protective film 23 is coated on the surface of the upper dielectric thick film 22.

In the conventional art, the barrier ribs are fabricated by LTCCM (low temperature cofired ceramic on metal) method that is favorable to obtain a high aspect ratio. That is, after fabricating a green sheet, the green sheet is attached on the upper surface of the rear substrate for a plasma display panel, on which a predetermined metal mold is mounted and pressurized with an uniform pressure to mold a barrier rib form. And then, the metal mold is removed, and the thusly obtained green sheet in the barrier rib is dried at the temperature of 300~350° C. for 15~20 minutes to remove an organic solvent and is sintered at the temperature of 750~800° C., thereby forming the barrier ribs.

The green sheet as a material for the barrier ribs is made in a manner that an organic solvent (vehicle) is mixed with a parents glass powder to fabricate a slurry, which is then configured on the sheet by using a tape casting device. A composition ratio of the parents glass powder as the principle material of the green sheet is as shown in the below Table 1.

TABLE 1

| Composition | $SiO_2$ | ZnO | $B_2O_3$ | MgO |
|---|---|---|---|---|
| Wt % | 20~30 | 20~40 | 15~25 | 20~30 |

Characteristics of the barrier ribs of the conventional art having above composition ratio are as shown in the below Table 2.

TABLE 2

| Sintering temperature | Dielectric constant | Coefficient of thermal expansion ($10^{-7}$/° C.) | Withstand voltage (kV) |
|---|---|---|---|
| 750~850 | 6~9 | 75~85 | >1.5 |

That is, the material of the barrier ribs that is generally used in the conventional art has a drawback in that since it has a high content of a substance of which sintering temperature is high, such as $SiO_2$, $B_2O_3$ or MgO, so that its sintering temperature is high. High sintering temperature causes a deformation to a thin metal substrate, the rear substrate of the plasma display panel during sintering.

Therefore, a material for the barrier ribs that would have a low dielectric constant, a low coefficient of thermal expansion, a high withstand voltage and a low sintering temperature is required.

SUMMARY OF THE INVENTION

Therefore, an object of the present invention is to provide a composition of a dielectric for a plasma display panel in use for fabricating a barrier rib having a low sintering temperature, a low coefficient of thermal expansion, a low dielectric constant and a high withstand voltage.

To achieve these and other advantages and in accordance with the purpose of the present invention, as embodied and broadly described herein, there is provided a composition of a dielectric for a plasma display panel comprising a parents glass powder containing 20~40 wt % of ZnO, 15~30 wt % of $SiO_2$, 10~20 wt % of $B_2O_3$, 0~30 wt % of PbO, 0~20 wt % of MgO, 1~10 wt % of CaO, 1~10 wt % of $Al_2O_3$, 0~10 wt % of $K_2O$, 0~8 wt % of $Na_2O$, 0~5 wt % of $Li_2O$, 0~2 wt % of $Sb_2O_3$, and 0~2 wt % of $As_2O_3$.

In order to achieve the above object, in the composition of a dielectric for a plasma display panel, the sum of the ingredients of PbO, MgO and CaO is less than 40 wt %.

In order to achieve the above object, in the composition of a dielectric for a plasma display panel, the sum of the ingredients of $Li_2O$, $K_2O$ and $Na_2O$ is less than 10 wt %.

In order to achieve the above object, the composition of a dielectric for a plasma display panel comprises of a mixture of a parents glass powder and an oxide filler in a predetermined ratio.

In order to achieve the above object, the oxide filler in the composition of a dielectric for a plasma display panel refers to at least one of $Mg_2Al_4Si_5O_{18}$, $2MgOSiO_2$, $Zn_2SiO_4$, $PbTiO_2$, quartz, $Al_2O_3$, $TiO_2$, $ZrO_2$, $MgOAl_2O_3$, $3Al_2O_3$ ($2SiO_2$), $MgTiO_3$, $Zn2SiO_4$, $LiAl(SiO_4)$ and $BPO_4$.

In order to achieve the above object, in the composition of a dielectric for a plasma display panel, 5~50% of oxide filler is mixed with 100% of parents glass powder.

In order to achieve the above object, the composition of a dielectric for a plasma display panel is used for a dielectric thick film to be formed on a rear substrate or on barrier ribs.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
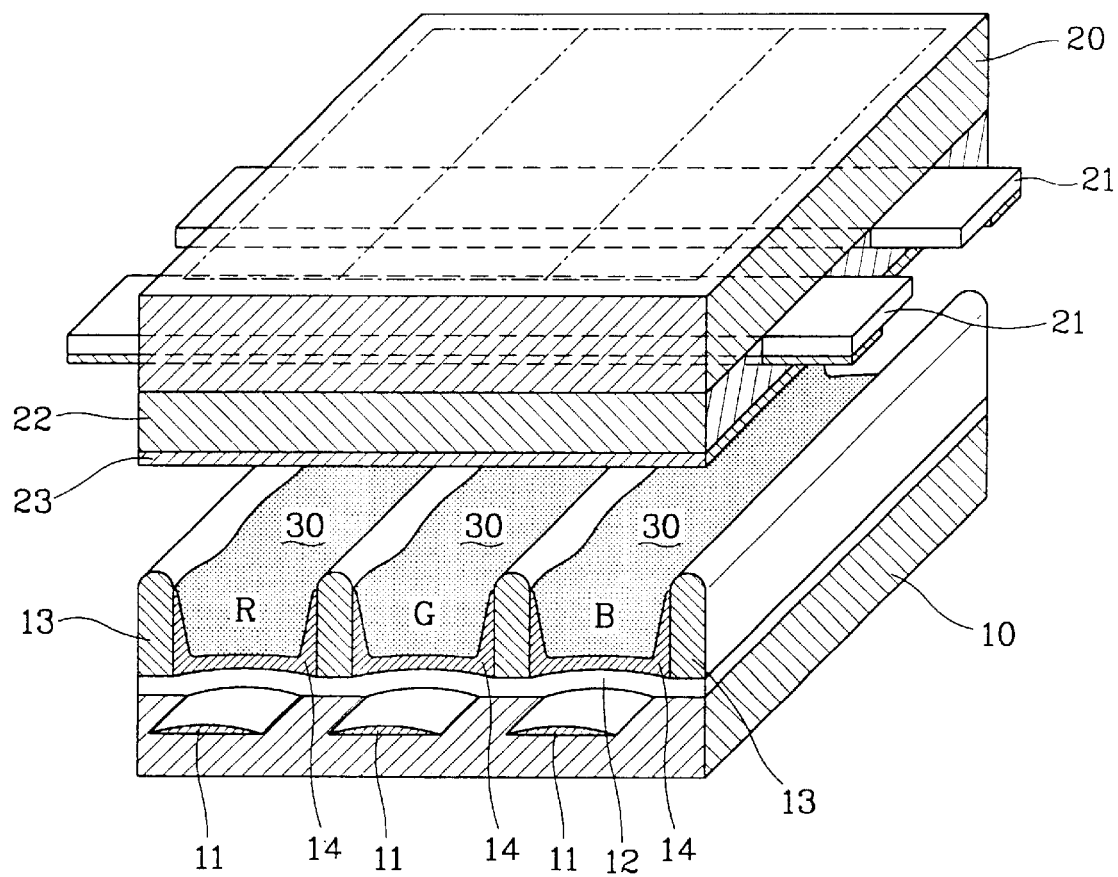
FIG. 1 is a schematic view showing a structure of a plasma display panel in accordance with a conventional art.

Other objects and advantages of the present invention will now be disclosed with descriptions of a preferred embodiment of the present invention.

A composition of a dielectric in accordance with a first embodiment of the present invention is as shown in the below Table 3.

TABLE 3

| Ingredient | ZnO | $SiO_2$ | $B_2O_3$ | PbO | MgO | CaO |
|---|---|---|---|---|---|---|
| Wt % | 20~40 | 15~30 | 10~20 | 0~30 | 0~20 | 1~10 |
| Ingredient | $Al_2O_3$ | $K_2O$ | $Na_2O$ | $Li_2O$ | $Sb_2O_3$ | $As_2O_3$ |
| Wt % | 1~10 | 0~10 | 0~8 | 0~5 | 0~2 | 0~2 |

In the Table 3, composition ratio (%) was calculated by regarding the total weight of the parents glass as 100 wt %.

The composition of a dielectric for a plasma display panel in accordance with one embodiment of the present invention contains 20~40 wt % of ZnO, 15~30 wt % of $SiO_2$, 10~20 wt % of $B_2O_3$, 0~30 wt % of PbO, 0~20 wt % of MgO, 1~10 wt % of CaO, 1~10 wt % of $Al_2O_3$, 0~10 wt % of $K_2O$, 0~8 wt % of $Na_2O$, 0~5 wt % of $Li_2O$, 0~2 wt % of $Sb_2O_3$, and 0~2 wt % of $As_2O_3$.

The above composition is featured in that the contents of $SiO_2$, MgO and $B_2O_3$, substances having a high sintering temperature, were reduced compared to those of the composition of a dielectric of the conventional art, and PbO, a substance having a low sintering temperature, was added thereto at the rate of 0~30%.

As to the composition of a dielectric for a plasma display panel in accordance with one embodiment of the present invention, it is preferred that the sum of the ingredients of PbO, MgO and CaO is below 40 wt %. And, the sum of the ingredients of $Li_2O$, $K_2O$ and $Na_2O$ in the composition is preferably below 10 wt %.

A composition of a dielectric for a plasma display panel in accordance with another embodiment of the present invention is a mixture of the composition of a dielectric (that is, the parents glass powder) obtained in the first embodiment and a filler. Namely, the composition comprises of a mixture of the parents glass powder, that is, the composition of a dielectric in accordance with the first embodiment, and the oxide filler in a predetermined ratio. As to the mixture ratio, preferably, 100 wt % of parents glass powder is mixed with 5~50 wt % of oxide filler. In this respect, the oxide filler refers to one of $Mg_2Al_4Si_5O_{18}$, 2Mg)$SiO_2$, $Zn_2SiO_4$, $PbTiO_2$, quartz, $Al_2O_3$, $TiO_2$, $ZrO_2$, $MgOAl_2O_3$, $3Al_2O_3$ (2$SiO_2$), $MgTiO_3$, $Zn2SiO_4$, LiAl ($SiO_4$) and $BPO_4$.

Characteristics of the composition of a dielectric for a plasma display panel in accordance with the first or the second embodiment of the present invention are as shown in the below Table 4.

TABLE 4

| Sintering temperature (° C.) | Dielectric constant (@ 1 MHz) | Coefficient of thermal expansion ($10^{-7}$/° C.) | Withstand voltage (kV) |
|---|---|---|---|
| 550~750 | 6~9 | 75~85 | >1.5 |

As shown in the above Table 4, the compositions of a dielectric for a plasma display panel in accordance with the present invention have characteristics in that its sintering temperature is 550~750° C., lower than that of the conventional art, while maintaining the same level of dielectric constant, coefficient of thermal expansion and withstand voltage as those of the conventional art.

The compositions of a dielectric for a plasma display panel in accordance with the first or the second embodiment of the present invention is adoptable to form a barrier rib or a dielectric layer for the rear substrate of a plasma display panel.

As so far described, the composition of a dielectric for a plasma display panel in accordance with the present invention has a low sintering temperature, so that the rear substrate for a plasma display panel can be prevented from deforming as well as reducing a cycle time of the sintering process. Accordingly, in case of fabricating a PDP by using the composition of a dielectric of the present invention, a reliability of the plasma display panel can be highly improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A composition of a dielectric for a plasma display panel comprising:

a parent glass powder containing 20~40 wt % of ZnO, 15~30 wt % of $SiO_2$, 10~20 wt % of $B_2O_3$, at most 30 wt % of PbO, at most 20 wt % of MgO, 1~10 wt % of CaO, 1~10 wt % of $Al_2O_3$, 0~10 wt % of $K_2O$, 0~8 wt % of $Na_2O$, 0~5 wt % of $Li_2O$, 0~2 wt % of $Sb_2O_3$, and 0~2 wt % of $As_2O_3$; and an oxide filler mixed with the parent glass powder to drop sintering temperature of the composition, wherein the oxide filler includes at least one material selected from the group consisting of $Mg_2Al_4Si_5O_{18}$, $2MgOSiO_2$, $Zn_2SiO_4$, $PbTiO_2$, quartz, $Al_2O_3$, $TiO_2$, $ZrO_2$, $MgOAl_2O_3$, $3Al_2O_3$ (2$SiO_2$), $MgTiO_3$, $Zn2SiO_4$, LiAl ($SiO_4$) and $BPO_4$, wherein the parent glass powder contains PbO, MgO, and CaO and the sum of the ingredients of PbO, MgO, and CaO is below 40 wt % and the sum of the ingredients of $Li_2O$, $K_2O$, and $Na_2O$ is below 10 wt %.

2. The composition of a dielectric for a plasma display panel according to claim 1, wherein 5~50% of oxide filler is mixed with 100% of parent glass powder.

3. The composition of a dielectric for a plasma display panel according to claim 1, wherein said composition is used for a dielectric thick film to be formed on a rear substrate or on barrier ribs.

4. A dielectric composition for a plasma display panel, comprising a parent glass, wherein the parent glass comprises:

20 to 40 wt % ZnO;
15 to 30 wt % $SiO_2$;
10 to 20 wt % $B_2O_3$;
at most 30 wt % PbO;
at most 20 wt % MgO;
1 to 10 wt % CaO;
0 to 10 wt % $K_2O$;
0 to 8 wt % $Na_2O$;
0 to 5 wt % $Li_2O$;
1–10 wt % $Al_2O_3$;
0 to 2 wt % $Sb_2O_3$; and
at most 2 wt % $As_2O_3$;

wherein the parent glass contains PbO, MgO, and CaO and the sum of the ingredients of PbO, MgO, and CaO is at most 40 wt % and the sum of the ingredients of $Li_2O$, $Na_2O$, and $K_2O$ is below 10 wt %, and an oxide filler mixed with the parent glass to drop the sintering temperature of the composition, wherein the oxide filler includes at least one material selected from the group consisting of $Mg_2Al_4Si_5O_{18}$, $2MgOSiO_2$, $Zn_2SiO_4$, $PbTiO_2$, quartz, $Al_2O_3$, $TiO_2$, $ZrO_2$, $MgOAl_2O_3$, $3Al_2O_3(2SiO_2)$, $MgTiO_3$, $Zn2SiO_4$, $LiAl(SiO_4)$, and $BPO_4$.

5. A plasma display panel comprising a front and rear substrate horizontally disposed to each other, address electrodes formed on the rear substrate, a first dielectric layer formed on the address electrodes, transparent electrodes formed on the front substrate and a second dielectric layer formed on the transparent electrodes, wherein the improvement comprises a dielectric composition for at least one of the first or second dielectric layers, comprising a parent glass comprising:

20 to 40 wt % ZnO;
15 to 30 wt % $SiO_2$;
10 to 20 wt % $B_2O_3$;
at most 30 wt % PbO;
at most 20 wt % MgO;
1 to 10 wt % CaO;
0 to 10 wt % $K_2O$;
0 to 8 wt % $Na_2O$;
0 to 5 wt % $Li_2O$;
1–10 wt % $Al_2O_3$;
0 to 2 wt % $Sb_2O_3$; and
at most 2 wt % $As_2O_3$;

wherein the parent glass contains PbO, MgO, and CaO and the sum of the ingredients of PbO, MgO, and CaO is at most 40 wt % and the sum of the ingredients of $Li_2O$, $Na_2O$, and $K_2O$ is below 10 wt %, and an oxide filler mixed with the parent glass to drop the sintering temperature of the composition, wherein the oxide filler includes at least one material selected from the group consisting of $Mg_2Al_4Si_5O_{18}$, $2MgOSiO_2$, $Zn_2SiO_4$, $PbTiO_2$, quartz, $Al_2O_3$, $TiO_2$, $ZrO_2$, $MgOAl_2O_3$, $3Al_2O_3(2SiO_2)$, $MgTiO_3$, $Zn2SiO_4$, $LiAl(SiO_4)$, and $BPO_4$.

6. The plasma display panel of claim 5, wherein the oxide filler comprises 5~50 wt % mixed with 100 wt % of the parent glass for the mixture ratio of the dielectric composition.

* * * * *